Patented Oct. 17, 1944

2,360,730

UNITED STATES PATENT OFFICE 2,360,730

PROCESS OF TREATING WATER FOR STEAM BOILERS

George W. Smith, Pittsburgh, Pa.

No Drawing. Application October 8, 1942,
Serial No. 461,248

12 Claims. (Cl. 210—23)

This invention relates to a process of treating water for steam boilers by a treating chemical which causes precipitation of calcium of the boiler water in the form of a non-adherent sludge and which simultaneously neutralizes part of the boiler water alkalinity.

Hall and Jackson Patent 1,903,041 discloses a process of treating boiler water with molecularly dehydrated alkali-metal phosphates such as sodium metaphosphate or sodium pyrophosphate. These materials when subjected to high temperatures such as that of the boiler water are converted into acid orthophosphate. The hydrogen of the acid orthophosphate neutralizes a part of the boiler water alkalinity. The orthophosphate radical $PO_4$ combines with the calcium of the boiler water so as to cause the calcium to be precipitated in the form of non-adherent sludge rather than as adherent boiler scale.

In accordance with the teaching of the Hall and Jackson Patent 1,903,041, sodium metaphosphate $NaPO_3$ when reaching the boiler either by direct feed into the boiler drum or into the feed water reacts with the hot water boiler water to form monosodium dihydrogen orthophosphate $NaH_2PO_4$.

(1) $NaPO_3 + H_2O = NaH_2PO_4$

Two molecules of $NaPO_3$ thereby yield two  radicals and four acid hydrogens. The two $PO_4{}^{---}$ radicals are sufficient to combine with and precipitate as non-adherent sludge, three $Ca^{++}$. The four acid hydrogens simultaneously produced are sufficient to react with and neutralize four molecules of NaOH, or four $OH^-$ groups).

It is apparent, therefore, that the actual boiler water conditioning radical, $PO_4{}^{---}$, is introduced into the boiler in a compound ($NaH_2PO_4$) which releases only one-third as many equivalents of metal ions (in this case $Na^+$) as equivalents of boiler water conditioning ion, ($PO_4{}^{---}$).

According to the present invention, water for steam boilers is treated by supplying to it molecularly dehydrated phosphate of the bivalent and trivalent metals. The preferred materials are the molecularly dehydrated phosphates of the class consisting of calcium, barium, strontium, magnesium, aluminum and iron. Calcium metaphosphate $Ca(PO_3)_2$ may be taken as a typical example of the preferred materials and the invention will be described particularly as applied to the use of this preferred material. It is to be understood, however, as later pointed out more in detail, that various other molecularly dehydrated phosphates may be employed.

Since one of the primary objects of the use of phosphates for boiler water conditioning such as is taught in Hall Patent 1,613,656 is the prevention of the precipitation of calcium as an adherent scale in the boiler by forcing its precipitation as a non-adherent sludge, and since further a well-settled principle of treatment of water for boiler use is to remove, where feasible, a large proportion of the calcium before the water enters the boiler, it may seem strange or impractical to suggest the use of a calcium phosphate for final phosphate conditioning of the boiler water.

While calcium metaphosphate is slowly soluble in cold water, some days or weeks being required for complete solution, its rate of solution increases materially at high temperatures and in the presence of salts, such as sodium chloride, so that at the temperatures encountered in feed water or boiler water it dissolves sufficiently rapidly to be useful in treating such waters. It may be introduced into the boiler by feeding a slurry of very finely divided calcium metaphosphate to the feed water or directly to the boiler water or by passing hot boiler feed water through a reservoir supplied and periodically replenished with granular calcium metaphosphate, or by circulating hot boiler water through such a reservoir.

When calcium metaphosphate is placed in solution in the boiler water, the following reaction at once takes place, due to the elevated temperature of the water:

(2) $Ca(PO_3)_2 + 2H_2O \rightarrow CaH_4(PO_4)_2$

The monocalcium orthophosphate formed by this reaction at once combines with the caustic alkali in the boiler according to the reaction:

(3) 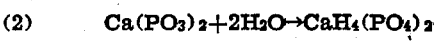
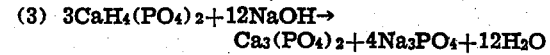

Thus, for every equivalent of calcium metaphosphate added to the boiler water there is generated in the boiler water one equivalent of calcium and three equivalents of $PO_4$. One of these equivalents of $PO_4$ is required for the precipitation of the calcium introduced as calcium metaphosphate; the other two equivalents of $PO_4$ are available for the precipitation of calcium entering the boiler water from other sources. Accordingly, for every two equivalents of calcium otherwise present in the feed water flowing to the boiler, it is necessary to add three equivalents of calcium metaphosphate. These three equivalents of calcium metaphosphate render available six equivalents of acid hydrogen which is available for neutralizing boiler alkalinity.

It will therefore be seen that if a feed water entering a boiler contains twenty P. P. M. calcium or one equivalent per million and this water be treated in the boiler with calcium metaphosphate, the amount of acid hydrogen liberated by the amount of calcium metaphosphate required to precipitate the total calcium present as tricalcic phosphate is fifty per cent greater than the amount of acid hydrogen liberated by the quantity of sodium metaphosphate required to treat the same water. This follows because the presence of one equivalent of calcium in the feed water requires the addition of only one-third of an equivalent of sodium metaphosphate which upon hydrolysis liberates two-thirds of an equivalent of acid hydrogen, whereas the precipitation of one equivalent of calcium as calcium orthophosphate requires the addition of one-half an equivalent of calcium metaphosphate and results in the production in the boiler water of one equivalent of acid hydrogen.

The net result of treatment with calcium metaphosphate (the equivalent weight of which is 99, the equivalent weight of sodium metaphosphate being 102) is that approximately fifty per cent more calcium metaphosphate is required and approximately fifty per cent more acid neutralizing hydrogen ion is liberated in the boiler by the required amount of calcium metaphosphate treatment.

It will be seen from this that treatment with calcium metaphosphate, which is itself substantially neutral, is as effective as treatment with phosphoric acid in the reduction of boiler water alkalinities.

If we rank certain of the boiler water treating phosphates in order of alkali reduction for the same calcium hardness-precipitating power, placing first those having the greatest amount of alkali neutralizing capacity they fall in the following order, as indicated in the following table: (1) calcium metaphosphate, calcium pyrophosphate, magnesium metaphosphate, ferrous metaphosphate, ferric metaphosphate, aluminum metaphosphate and phosphoric acid. (2) sodium metaphosphate, (3) sodium tripolyphosphate, (4) disodium phosphate and sodium pyrophosphate. Trisodium phosphate has no alkali neutralizing capacity.

TABLE

Comparison of calcium-precipitating and alkali-neutralizing power of some phosphates

| Formula of phosphate | Phosphate radical developed in boiler water | Calcium introduced with compound | Calcium from water which can be pptd. | Alkali-neutralizing power, hydrogen ions released | Ratio H+ released per Ca++ pptd. from water |
|---|---|---|---|---|---|
| $2H_3PO_4$ | $2PO_4^{---}$ | None | $3Ca^{++}$ | $6H^+$ | 2 |
| $Ca(PO_3)_2$ | $2PO_4^{---}$ | $1Ca^{++}$ | $2Ca^{++}$ | $4H^+$ | 2 |
| $Ca_2P_2O_7$ | $2PO_4^{---}$ | $2Ca^{++}$ | $1Ca^{++}$ | $2H^+$ | 2 |
| $Mg(PO_3)_2$ | $2PO_4^{---}$ | None | $3Ca^{++}$ | $6H^+$ | 2 |
| $Fe(PO_3)_2$ | $2PO_4^{---}$ | do | $3Ca^{++}$ | $6H^+$ | 2 |
| $2Fe(PO_3)_3$ | $6PO_4^{---}$ | do | $9Ca^{++}$ | $18H^+$ | 2 |
| $2Al(PO_3)_3$ | $6PO_4^{---}$ | do | $9Ca^{++}$ | $18H^+$ | 2 |
| $2NaPO_3$ | $2PO_4^{---}$ | do | $3Ca^{++}$ | $4H^+$ | 1.33 |
| $2Na_5P_3O_{10}$ | $6PO_4^{---}$ | do | $9Ca^{++}$ | $8H^+$ | 0.88 |
| $2Na_2HPO_4$ | $2PO_4^{---}$ | do | $3Ca^{++}$ | $2H^+$ | 0.67 |
| $Na_4P_2O_7$ | $2PO_4^{---}$ | do | $3Ca^{++}$ | $2H^+$ | 0.67 |
| $Na_3PO_4$ | $2PO_4^{---}$ | do | $3Ca^{++}$ | None | 0 |

Calcium metaphosphate used may be either in glassy form or in crystalline form. Furthermore, the glassy calcium phosphates may be formed with a greater amount of calcium than that which corresponds to calcium metaphosphate. It is believed that calcium phosphates containing more calcium than calcium pyrophosphate are of little utility for the purpose of this invention, but the invention includes the treatment of boiler waters and boiler feed waters with any substantially neutral or alkaline calcium phosphate compound containing fewer equivalents of calcium when fully hydrolyzed by the boiler water than it contains of $PO_4$. Calcium metaphosphate $Ca(PO_3)_2$ has a molecular ratio of CaO to $P_2O_5$ of 1:1. Glasses having a different molecular ratio of CaO to $P_2O_5$ than the metaphosphate may be used according to the present invention. The molecular ratio of CaO to $P_2O_5$ may be from about 0.8:1 to 1.7:1. If crystalline phosphates are employed instead of glassy phosphates, the crystalline phosphates may be the metaphosphates, tripolyphosphates, pyrophosphates or compounds or mixtures having a molecular ratio of the oxide of calcium, barium, strontium, magnesium, aluminum, iron or other bivalent or trivalent metal to $P_2O_5$ between the ratio for metaphosphate (1:1) and the ratio of pyrophosphate (2:1).

In the event less alkali reduction is required in the boiler water than would be obtained by the use of calcium metaphosphate and for the purpose of increasing the solubility of the treating chemical, the calcium phosphate may be formed as an homogeneous glass or as an annealed crystalline mixture of molecularly dehydrated calcium phosphates and molecularly dehydrated sodium phosphates, for example metaphosphates, pyrophosphates or tripolyphosphates, or it may be fed to the boiler concurrently with monosodium, disodium, or trisodium orthophosphates. On the other hand, it may be fed to the boiler concurrently with phosphoric acid. It may be placed in solution with caustic soda or phosphoric or other mineral acids and the mixture added to the boiler water or in fact any one of a number of obvious variations of the principle may be adopted.

The invention is not confined to the use of calcium compounds of the molecularly dehydrated phosphoric acids but includes other compounds of these acids besides calcium and the alkali-metals and alkaline earths. For example, magnesium metaphosphate, crystalline or glassy, magnesium pyrophosphate or magnesium tripolyphosphate, may be used alone or in mixture with other phosphates or other acids, bases, or salts, magnesium metaphosphate having an advantage over the calcium metaphosphate in that the magnesium may combine in the boiler water with silica to produce magnesium-silicate sludge. When dissolved silica is absent or low in amount, the magnesium will combine in the boiler with hydroxide to produce insoluble magnesium hydroxide. In the latter case the alkali reduction obtained, where phosphate is fed equivalent to calcium in the feed water, is the same as that obtained when using calcium metaphosphate.

Another example is aluminum metaphosphate and other glassy or crystalline molecularly dehydrated aluminum phosphates either per se or mixed with solubilizing materials such as the sodium phosphates.

Barium metaphosphate or other barium molecularly dehydrated phosphate either in glassy or in crystalline form may be used according to the invention. Barium metaphosphate causes the precipitation of sulphate ion from the boiler water as a sludge of barium sulphate, thereby tending to reduce the concentration of dissolved solids in the boiler water. Barium metaphosphate has the advantage that it can be converted into a glass at a much lower temperature than the metaphosphates of calcium, magnesium or aluminum.

Molecularly dehydrated ferrous phosphates can be made by neutralizing with disodium or trisodium orthophosphates the "pickle liquor" which is a waste product of the pickling of steel with sulphuric acid. This waste liquor is essentially a solution of ferrous sulphate and sulphuric acid. By precipitating acid orthophosphates from the solution, separating the compounds and subjecting them to molecular dehydration in a non-oxidizing atmosphere, glassy or crystalline molecularly dehydrated ferrous phosphates are obtained. When used according to the present invention, they liberate ferrous ions as they hydrolyze in the boiler and these ferrous ions are oxidized to ferric ions by any dissolved oxygen present, thus preventing the dissolved oxygen from contributing to corrosion of the steel of the boiler. The ferric ions so produced are precipitated as a sludge of insoluble hydrous ferric oxide along with the calcium phosphate resulting from the inter-action of the phosphate with the calcium ions of the boiler water so that both phosphate conditioning and the scavenging of oxygen are accomplished without increasing the concentration of dissolved salts in the boiler water.

In addition to the advantages already referred to there is a further advantage derived from the conditioning of boiler water with molecularly dehydrated phosphates of the bivalent and trivalent metals as compared to those of the alkali-metals. In the case of the latter, all of the alkali-metal ion introduced into the boiler water remains in solution, thus building up the concentration of dissolved salts. In contrast, the bivalent and trivalent metal ions introduced are precipitated almost completely, so that treatment with the molecularly dehydrated phosphates of the bivalent and trivalent metals results in substantially no increase in the concentration of dissolved salts. This is particularly important in the case of boilers which are subject to carry-over and in which the concentration of dissolved salts is customarily limited by blowdown in order to minimize contamination of the steam by this carry-over.

Although I have mentioned specifically the molecularly dehydrated phosphates of calcium, barium, strontium, magnesium, aluminum and iron, it is within the scope of my invention to use the molecularly dehydrated phosphates of any bivalent or trivalent metal which is not subversive of the properties of the phosphate in the treatment of water for steam boilers. The molecularly dehydrated phosphates of all bivalent and trivalent metals which precipitate in the boiler as orthophosphate or hydroxide have the advantage over sodium metaphosphate that they have greater alkali reduction power for the same calcium hardness-precipitating power.

The invention is not limited to the preferred materials, which have been given merely by way of illustration, but may be otherwise embodied or practiced within the scope of the following claims.

I claim:

1. The process of treating water for steam boilers, which comprises supplying thereto molecularly dehydrated phosphate of a member of the class consisting of the bivalent and trivalent metals, subjecting the thus treated water to heat and pressure in a boiler to revert the molecularly dehydrated phosphate to orthophosphate which reacts with the alkalinity in the boiler water and precipitates calcium orthophosphate.

2. The process of treating water for steam boilers, which comprises supplying thereto molecularly dehydrated phosphate of a member of the class consisting of calcium, barium, strontium, magnesium, aluminum and iron, subjecting the thus treated water to heat and pressure in a boiler to revert the molecularly dehydrated phosphate to orthophosphate which reacts with the alkalinity in the boiler water and precipitates calcium orthophosphate.

3. The process of treating water for steam boilers, which comprises supplying thereto glassy molecularly dehydrated phosphate of a member of the class consisting of calcium, barium, strontium, magnesium, aluminum and iron, subjecting the thus treated water to heat and pressure in a boiler to revert the molecularly dehydrated phosphate to orthophosphate which reacts with the alkalinity in the boiler water and precipitates calcium orthophosphate.

4. The process of treating water for steam boilers, which comprises supplying thereto crystalline molecularly dehydrated phosphate of a member of the class consisting of calcium, barium, strontium, magnesium, aluminum and iron, subjecting the thus treated water to heat and pressure in a boiler to revert the molecularly dehydrated phosphate to orthophosphate which reacts with the alkalinity in the boiler water and precipitates calcium orthophosphate.

5. The process of treating water for steam boilers, which comprises supplying thereto molecularly dehydrated alkaline earth metal phosphate, subjecting the thus treated water to heat and pressure in a boiler to revert the molecularly dehydrated phosphate to orthophosphate which reacts with the alkalinity in the boiler water and precipitates calcium orthophosphate.

6. The process of treating water for steam boilers, which comprises supplying thereto molecularly dehydrated calcium phosphate, subjecting the thus treated water to heat and pressure in a boiler to revert the molecularly dehydrated phosphate to orthophosphate which reacts with the alkalinity in the boiler water and precipitates calcium orthophosphate.

7. The process of treating water for steam boilers, which comprises supplying thereto metaphosphate of a member of the class consisting of calcium, barium, strontium, magnesium, aluminum and iron, subjecting the thus treated water to heat and pressure in a boiler to revert the metaphosphate to orthophosphate which reacts with the alkalinity in the boiler water and precipitates calcium orthophosphate.

8. The process of treating water for steam boilers, which comprises supplying thereto alkaline earth metal metaphosphate, subjecting the thus treated water to heat and pressure in a boiler to revert the metaphosphate to orthophosphate which reacts with the alkalinity in the boiler water and precipitates calcium orthophosphate.

9. The process of treating water for steam boilers, which comprises supplying thereto calcium metaphosphate, subjecting the thus treated water to heat and pressure in a boiler to revert the metaphosphate to orthophosphate which reacts with the alkalinity in the boiler water and precipitates calcium orthophosphate.

10. The process of treating water for steam boilers, which comprises supplying thereto glassy molecularly dehydrated phosphate of a metal of the class consisting of calcium, barium, strontium, magnesium, aluminum and iron in which the molar ratio of oxide of metal of said class to $P_2O_5$ is between about 0.8:1 and 1.7:1, subjecting the thus treated water to heat and pressure in a boiler to revert the molecularly dehydrated phosphate to orthophosphate which reacts with the alkalinity in the boiler water and precipitates calcium orthophosphate.

11. The process of treating water for steam boilers, which comprises supplying thereto glassy molecularly dehydrated calcium phosphate in which the molar ratio of CaO to $P_2O_5$ is between about 0.8:1 and 1.7:1, subjecting the thus treated water to heat and pressure in a boiler to revert the molecularly dehydrated phosphate to orthophosphate which reacts with the alkalinity in the boiler water and precipitates calcium orthophosphate.

12. The process of treating water for steam boilers, which comprises supplying thereto glassy calcium metaphosphate, subjecting the thus treated water to heat and pressure in a boiler to revert the metaphosphate to orthophosphate which reacts with the alkalinity in the boiler water and precipitates calcium orthophosphate.

GEORGE W. SMITH.

CERTIFICATE OF CORRECTION.

Patent No. 2,360,730. October 17, 1944.

GEORGE W. SMITH.

It is hereby certified that error appears in the printed specification of the above numbered patent requiring correction as follows: Page 1, first column, line 35, before "or four" insert an opening parenthesis; page 2, second column, line 15, for "CaA" read --CaO--; line 24, for "ratio of" read --ratio for--; and that the said Letters Patent should be read with this correction therein that the same may conform to the record of the case in the Patent Office.

Signed and sealed this 30th day of January, A. D. 1945.

Leslie Frazer (Seal)                  Acting Commissioner of Patents.